UNITED STATES PATENT OFFICE.

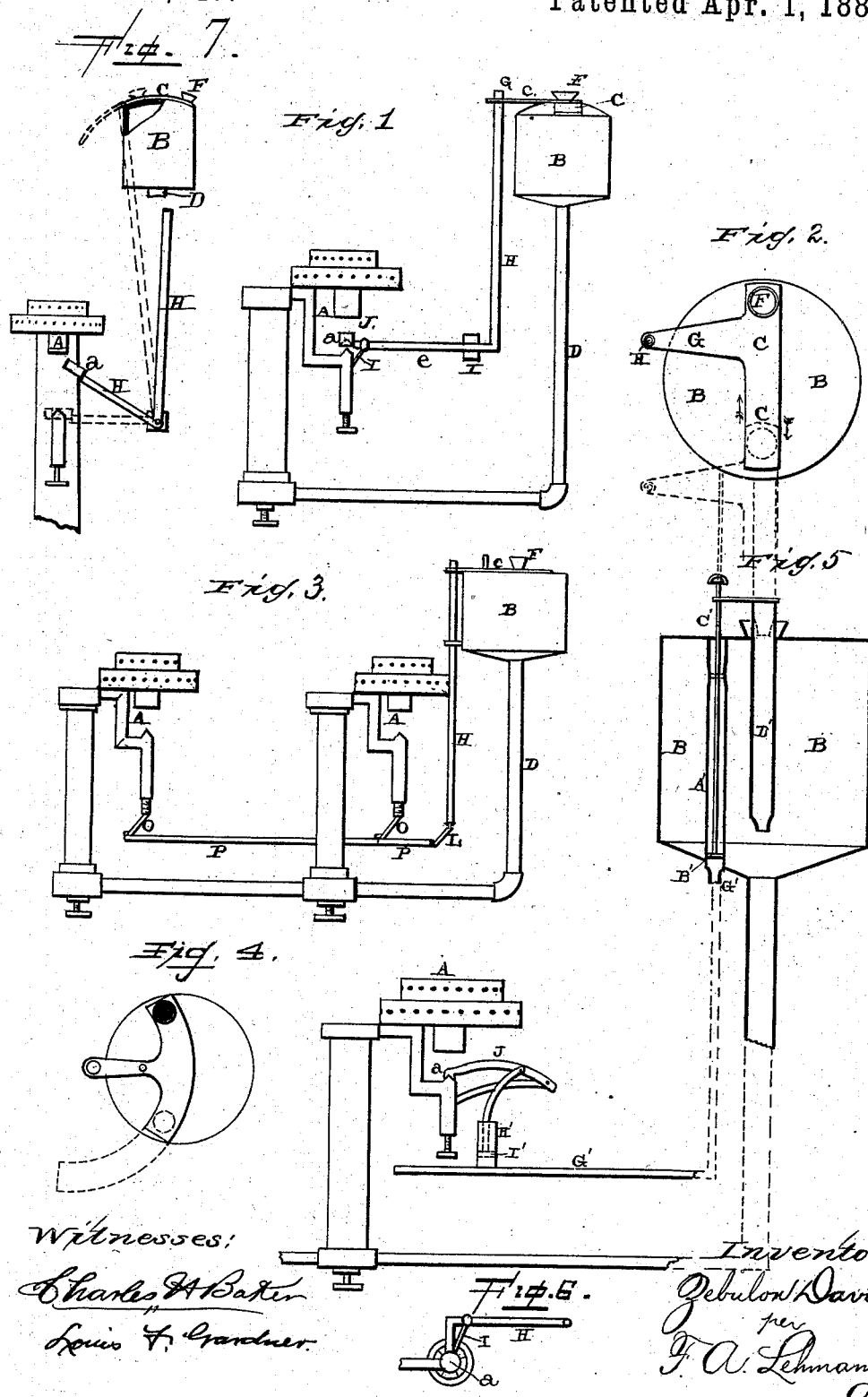

ZEBULON DAVIS, OF CANTON, OHIO.

VAPOR-BURNER.

SPECIFICATION forming part of Letters Patent No. 296,147, dated April 1, 1884.

Application filed December 8, 1882. (No model.)

*To all whom it may concern:*

Be it known that I, ZEBULON DAVIS, of Canton, in the county of Stark and State of Ohio, have invented certain new and useful Improvements in Vapor-Burners; and I do hereby declare the following to be a full, clear, and exact description of the invention, such as will enable others skilled in the art to which it pertains to make and use it, reference being had to the accompanying drawings, which form part of this specification.

My invention relates to an improvement in vapor-burners; and it consists in a combination of the cover of the reservoir with a rod or lever for operating a suitable valve for stopping the flow of vapor from the burner while the reservoir is being filled, and which rod or lever is connected to the cover of the reservoir in such a manner that the cover of the reservoir cannot be moved to allow the reservoir to be filled without moving the rod and stopping the flow of vapor, as will be more fully described hereinafter.

The object of my invention is to provide a cheap and simple mechanism whereby the flow of vapor from the burner or burners of a vapor-stove is positively stopped while the reservoir is being filled, and thus prevent the room from being filled with vapor by the forgetfulness of the person filling the reservoir to first turn off the flow of gas from the burner before he begins to fill the reservoir.

Figure 1 is a side elevation of a vapor-burner embodying my invention. Fig. 2 is a plan view of the reservoir, showing its top connected to the operating-lever. Fig. 3 is a side elevation of another form of my invention. Fig. 4 is a plan view of the reservoir. Fig. 5 shows another form of my invention. Fig. 6 is a detail view of what is shown in Fig. 1. Fig. 7 is an end view of a mechanism embodying my invention.

A represents a vapor-burner of any desired construction, and B is a reservoir which is connected thereto by means of a pipe, D, in the usual manner. Upon the top of the reservoir is loosely attached a cover, C, which may be made in the shape shown either in Fig. 2 or Fig. 4, or in any other shape or form that may be preferred. This cover will slide endwise upon the top of the reservoir, and will have a funnel, F, attached to it at one end. The other end of the cover is made to act as a stop or cover to the opening in the top of the reservoir. As this cover slides freely back and forth upon the top of the reservoir, the funnel F can be made to register with the hole in the top of the reservoir, and permit the reservoir to be filled. Projecting outward from this cover is a suitable arm, G, which extends beyond the edge of the reservoir a suitable distance, and to which arm is connected in any suitable manner an operating rod or lever, H. This rod H projects downward any suitable distance, and is journaled in a suitable bearing, I, which projects from one side of the burner. The lower portion of the rod H is bent at right angles to the vertical part, as shown in Fig. 6, and then the end upon which the extinguishing device or valve $a$ is secured is again bent at right angles. The bearing I serves simply as a support in which the rod H rocks when moved by the cover. When this sliding cover is moved endwise on the top of the reservoir, as shown in dotted lines in Fig. 2, the upper end of the rod H is moved a corresponding distance, and this movement of the vertical portion of the rod causes its horizontal portion $e$ to partially revolve in its bearing or bearings, and in revolving to apply the valve $a$, so as to cut off the supply of vapor. The end of this rod H beyond the bearing is made cup-shaped, and so formed as to fit gas-tight over the conical part of the burner, through which the main jet-orifice is made. This end $a$ of the rod forms a valve which fits over this conical part, when the rod is rocked or turned by the movement of the cover, in such a manner as to shut off all flow of gas into the room. The recess in this valve $a$ is made sufficiently deep so as not to strike against the needle-point which protrudes through the orifice. When the cover is moved for the purpose of bringing the funnel F over the opening in the top of the reservoir, the lever H is turned or rocked in its bearing in such a manner as to force the valve $a$ down over the top of the conical portion of the burner. As long as the opening in the reservoir is open, the valve $a$ is forced down upon the burner; but as soon as the cover is moved back into place, the valve is raised, so as to permit a free flow of vapor from the burner. It will be seen that this lever H and the cover C are so connected together that the flow of vapor is positively checked whenever the reservoir is opened for the purpose of being filled, and when the cover is turned back in position the valve is raised, so as to allow the flow of vapor to begin.

In Fig. 3 is shown another form of my invention, and which differs from what has been above described merely in the manner of operating the valve, the principle being the same. In this case the cover C upon the top of the reservor is made in the shape of a quadrant, and the operating-lever is connected to the arm which projects beyond the edge of the reservoir, as shown. To the lower end of the operating-rod will be attached a short connecting-rod, L, and to the lower end of this connecting-rod will be attached the rod P, which will extend from one burner to the other. To this rod P will be loosely attached the arms or levers O, which are secured to the lower end of the screw-shanks of the needle-valves. Instead of the thread upon these screws being made in the usual form, they will be given a much greater pitch, so that but a slight movement will be sufficient to cause the valves to shut off the flow of vapor. The arms O, rod P, the operating-rod, and connecting-rod L, will be so attached to each other as to move freely one upon the other without causing any binding action or strain, and allow the same valves to rise and fall sufficiently to shut off and turn on the flow of vapor.

The two forms of my invention here shown are but samples of the manner of operating valves at the same time that the cover of the reservoir is moved; but I do not limit myself to either one of the constructions shown, for this may be varied at will. The object of my invention is to automatically stop the flow of vapor from the burners whenever the reservoir is open for the purpose of being filled, and thus prevent a person, from either ignorance or carelessness, from allowing the room to fill with vapor, and thus endanger both life and property.

In Fig. 5 is shown another modification of my invention. Placed either inside or out of the reservoir is the cylinder A', in which works the piston B'. The piston-rod C' is connected to the elongated cover D' of the reservoir, so that when this cover of the reservoir is raised upward the piston is drawn upward at the same time, and when the cover is returned to place the piston is forced down in the cylinder. Around the top of the cover is placed a funnel, into which the oil is poured, and from which it runs into the reservoir when the cover is raised. Connected with the lower end of the cylinder is a pipe, G', which is connected at its lower end with a small cylinder, H', in which moves a piston, I'. Fastened to the upper end of the piston-rod, which is connected to the piston I', is the pivoted valve J'. When the piston in the upper cylinder is raised, a suction is caused in the lower cylinder, which causes the valve to close down over the top of the point, so as to shut off the flow of vapor.

Having thus described my invention, I claim—

1. The combination of the cover of the reservoir of a vapor-burner with an operating rod or lever which is connected at its upper end to the cover, and at its lower end to suitable means, whereby the movement of the cover will cause the rod to shut off or turn on the flow of vapor, substantially as shown.

2. The combination of the reservoir of a vapor-burner and cover loosely placed thereon, which cover is provided at one end with an opening or funnel, through which the reservoir is filled, and having an arm or projection extending from it to connect with an operating rod or lever, by means of which a valve is applied for stopping or turning on the flow of vapor when the cover is moved, substantially as set forth.

In testimony whereof I affix my signature in presence of two witnesses.

ZEBULON DAVIS.

Witnesses:
W. B. BLAKE,
H. W. HAMMOND.